(12) United States Patent
Michnacs et al.

(10) Patent No.: US 8,766,032 B2
(45) Date of Patent: *Jul. 1, 2014

(54) RECYCLED SUPERABSORBENT POLYMER PARTICLES

(75) Inventors: Marion Michnacs, Schwalbach (DE); Carsten Luckert, Euskirchen (DE); Carsten Zetzl, Hamburg (DE)

(73) Assignee: The Procter & Gamble Company, Cincinnati, OH (US)

( * ) Notice: Subject to any disclaimer, the term of this patent is extended or adjusted under 35 U.S.C. 154(b) by 601 days.

This patent is subject to a terminal disclaimer.

(21) Appl. No.: 13/035,153

(22) Filed: Feb. 25, 2011

(65) Prior Publication Data

US 2011/0208146 A1 Aug. 25, 2011

(30) Foreign Application Priority Data

Feb. 25, 2010 (EP) .................................... 10154618
Feb. 23, 2011 (WO) ................. PCT/US2011/025882

(51) Int. Cl.
*A61F 13/15* (2006.01)
*A61F 13/20* (2006.01)
*C08J 11/08* (2006.01)
*C08L 101/14* (2006.01)

(52) U.S. Cl.
CPC .............. *C08J 11/08* (2013.01); *C08J 2300/14* (2013.01); *C08L 101/14* (2013.01)
USPC .......................................... 604/367; 604/375

(58) Field of Classification Search
CPC .......... A61L 15/60; A61L 15/58; C08J 11/08; A61F 2013/51059; A61F 2013/530481; A61F 2013/530642; B29B 17/02; B29B 2017/0293; B29K 2105/0097; B29L 2031/4878; B65D 81/264
USPC ................................................. 604/367, 375
See application file for complete search history.

(56) References Cited

U.S. PATENT DOCUMENTS

| 3,860,003 | A | 1/1975 | Buell |
| 5,151,092 | A | 9/1992 | Buell et al. |
| 5,233,021 | A | 8/1993 | Sikorski |
| 5,618,003 | A | 4/1997 | Akiyoshi et al. |
| 8,252,848 | B2 | 8/2012 | Michnacs et al. |
| 2003/0040729 | A1 | 2/2003 | Malowaniec et al. |

(Continued)

FOREIGN PATENT DOCUMENTS

| EP | 0 538 535 A1 | 4/1993 |
| EP | 0 838 318 A2 | 4/1998 |

(Continued)

OTHER PUBLICATIONS

European Patent Office Search Report, Appln. No. 11155921.7-2307, dated Apr. 7, 2011, 10 pages.

(Continued)

*Primary Examiner* — Michele M Kidwell
(74) *Attorney, Agent, or Firm* — Andrew J. Mueller; Andrew A. Paul; Richard L. Alexander

(57) ABSTRACT

The present invention relates to absorbent cores comprising recycled superabsorbent polymer particles which have previously been immobilized by a solidified thermoplastic composition. The superabsorbent polymer particles can be separated from the solidified thermoplastic composition by using a supercritical fluid such as carbon dioxide, propane or mixtures thereof.

22 Claims, 6 Drawing Sheets

(56) References Cited

U.S. PATENT DOCUMENTS

| | | | |
|---|---|---|---|
| 2010/0099781 A1* | 4/2010 | Tian et al. | 521/40.5 |
| 2011/0207837 A1 | 8/2011 | Michnacs et al. | |
| 2011/0208146 A1 | 8/2011 | Michnacs et al. | |

FOREIGN PATENT DOCUMENTS

| | | |
|---|---|---|
| EP | 1 110 528 A2 | 6/2001 |
| EP | 1 310 225 A2 | 5/2003 |
| EP | 1506821 A1 | 2/2005 |
| JP | 2005-342570 A | 12/2005 |
| WO | WO 97/05194 A1 | 2/1997 |

OTHER PUBLICATIONS

International Search Report, PCT/US2011/026245, dated Jul. 4, 2011, 17 pages.

PCT International Search Report, PCT/US2011/025882, dated Jun. 28, 2011, 11 pages.

* cited by examiner

RECYCLED SUPERABSORBENT POLYMER PARTICLES

FIELD OF THE INVENTION

The present invention relates to recycling of superabsorbent polymer particles which have previously been immobilized by a solidified thermoplastic composition. The superabsorbent polymer particles can be separated from the solidified thermoplastic composition by using a supercritical fluid comprising carbon dioxide, propane or mixtures thereof.

BACKGROUND OF THE INVENTION

In the course of high speed manufacturing disposable absorbent articles, such as diapers and sanitary napkins, it is common to detect defect or imperfect articles and discard them from the production process. Though not suitable for sale, these waste products may contain materials, which are too valuable to be thrown away. Instead, it may be desirable to retrieve certain materials from the defect product. Especially, it is desirable to regain the superabsorbent polymer particles typically comprised in disposable absorbent articles.

Today, most disposable diapers use absorbent cores with superabsorbent polymer particles intermingled with pulp fibers (so-called "airfelt"), such as cellulose fibers. In these diapers, the superabsorbent polymer particles are largely held in place by the surrounding pulp fibers. The superabsorbent polymer particles may therefore be retrieved by shredding the articles and shaking the superabsorbent polymer particles out e.g. via vibration, freeing the particles from the surrounding pulp fibers.

However, moving to absorbent articles wherein the absorbent cores are free from airfelt or wherein the absorbent cores contain only small amounts of airfelt, the superabsorbent polymer particles have to be immobilized by different means, as they can no longer be held in place by surrounding pulp fibers. One way to immobilize the superabsorbent polymer particles within the absorbent core is by using adhesives. These adhesives, though used in small amounts relative to the amount of superabsorbent polymer particles, closely adhere to the superabsorbent polymer particles. Apart from attaching the superabsorbent polymer particles to each other, the adhesives can also affix the superabsorbent polymer particles to a carrier substrate, such as a nonwoven web. Thereby, the particles cannot simply be shaken out to recycle them.

It would be desirable to have a method for separating superabsorbent polymer particles from the adhesives in order to regain the particles. It would further be desirable to be able to recycle the superabsorbent polymer particles after separation by introducing them in other, newly manufactured absorbent articles. Therefore, the performance of the superabsorbent polymer particles, particularly regarding their permeability, but also with respect to their capacity and free swell rate, should not be unduly decreased in the recycling process, wherein the superabsorbent polymer particles are separated from a solidified thermoplastic composition.

SUMMARY OF THE INVENTION

The invention refers to an absorbent core comprising superabsorbent polymer particles. A part of the superabsorbent polymer particles are recycled superabsorbent polymer particles, the recycling comprises separating contaminated superabsorbent polymer particles from a solidified thermoplastic composition.

The invention also refers to the use of superabsorbent polymer particles in absorbent cores, wherein at least a part of the superabsorbent polymer particles are recycled superabsorbent polymer particles.

Further, the invention is directed towards a method for separating superabsorbent polymer particles from a solidified thermoplastic composition, the method comprising the steps of:
  a) providing agglomerates of the superabsorbent polymer particles and the solidified thermoplastic composition, wherein at least a part of the superabsorbent polymer particles are adhered to at least a part of the solidified thermoplastic composition,
  b) subjecting the agglomerates to a supercritical fluid comprising carbon dioxide, propane or mixtures thereof.

The UPM value of the separated superabsorbent polymer particles obtained by the method does not decrease by more than 40% while the superabsorbent polymer particles are subjected to steps a) and b).

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Definitions

Figure 1:
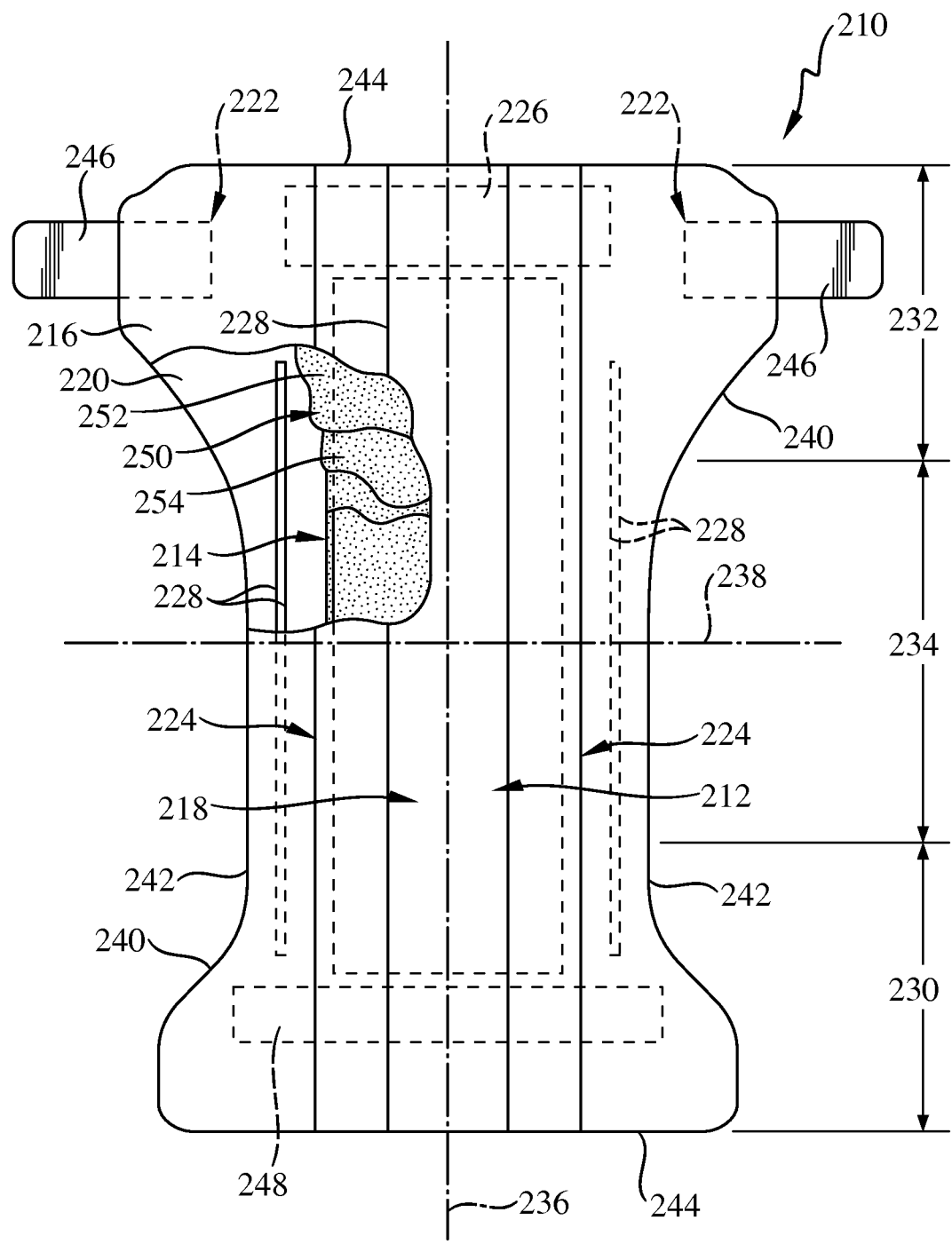
FIG. 1 is a plan view of a diaper as an example for an absorbent article of the present invention.

"Absorbent article" refers to devices that absorb and contain body exudates, and, more specifically, refers to devices that are placed against or in proximity to the body of the wearer to absorb and contain the various exudates discharged from the body. Absorbent articles may include diapers, pants, training pants, adult incontinence undergarments, sanitary napkin, and the like. As used herein, the term "body fluids" or "body exudates" includes, but is not limited to, urine, blood, vaginal discharges, breast milk, sweat and fecal matter. Preferred absorbent articles of the present invention are diapers, pants, training pants and/or sanitary napkins.

"Absorbent core" means a structure typically disposed between a topsheet and a backsheet of an absorbent article for absorbing and containing liquid received by the absorbent article. The absorbent core typically comprises absorbent material such as airfelt (comprising cellulose fibers), superabsorbent polymer particles (hereinafter referred to as SAP particles) and possibly nonwoven webs. In one embodiment, the absorbent core may comprise less than 10% of cellulose fibers or may even be substantially cellulose free (i.e. less than 1% cellulose) and may comprise one or more substrates, SAP particles disposed on the one or more substrates, and a solidified thermoplastic composition. The solidified thermoplastic composition is applied on the SAP particles and at least a portion of the one or more substrates for immobilizing the SAP particles on the one or more substrates. The one or more substrates may comprise or consist of nonwoven webs. The nonwoven webs will at least partially surround the SAP particles and the solidified thermoplastic composition and these nonwovens are therefore often referred to as core wrap or core cover. The core wrap or core cover may consist of an upper layer towards the body-facing surface of the absorbent article and of a lower layer towards the garment-facing side of the absorbent article. The two layers may be continuously or intermittently bonded to each other around their perimeters. The upper and lower layer may be made of the same nonwoven webs or may be made of different nonwoven webs, i.e. the upper layer may be fluid pervious whereas the lower layer may be fluid impervious. The core wrap/core cover may also consist of a single nonwoven web, which envelops the SAP particles and the solidified thermoplastic composition. In a multilayer absorbent core, one or more layers of a substrate (e.g. a nonwoven web) may additionally be placed within the absorbent core to at least partially separate and segment the SAP particles.

In the present invention, the absorbent cores will typically comprises more than 80% of SAP particles by weight of absorbent material (i.e. excluding any substrate layers), more preferably more than 90%. The absorbent core may even be free of airfelt. The absorbent material of the absorbent core may also consist solely of SAP particles.

In one embodiment, the absorbent core, in addition to the SAP particles, comprises an odor control compound. The odor control compound may be provided in the form of odor control particles. The odor control particles may be distributed homogeneously throughout the absorbent core or may, alternatively, be provided only in distinct areas, while other areas are free from odor control particles. For example, the odor control particles may be provided in the form of one or more distinct layers within the absorbent core. The odor control particles may have a particle size similar to the particle size of the SAP particles. In one embodiment, the odor control compound, e.g. the odor control particles, comprise tetra acetyl ethylene diamine and percarbonate. The odor control particles comprising percarbonate and tetra acetyl ethylene diamine may be comprised in an amount from 200 mg to 400 mg per absorbent core, preferably from 250 mg to 350 mg. Typically the weight of the SAP particles in the absorbent core will be from 30 times to 50 times the weight of the odor control compounds, preferably the weight of the SAP particles in the absorbent core will be from 35 times to 45 times the weight of the odor control compounds.

It is understood that for the present invention the solidified thermoplastic composition—as well as the odor control compound, if present—will not be considered to be a comprised by the absorbent material, as the solidified thermoplastic composition does not have absorbing properties. Further, for the present invention, the absorbent core does not include the topsheet, the backsheet and (if present) the acquisition system of the absorbent article.

"Superabsorbent polymer particles" ("SAP particles) as used herein refer to cross linked polymeric materials that can absorb at least 5 times their weight of an aqueous 0.9% saline solution as measured using the Centrifuge Retention Capacity test (Edana 441.2-01). The SAP particles are in particulate form so as to be flowable in the dry state. Preferred SAP particles of the present invention are made of poly(meth) acrylic acid polymers. However, e.g. starch-based SAP particles are also comprised within the scope of the present invention.

"Contaminated SAP particles" as used herein refers to SAP particles to which the solidified thermoplastic composition of the present invention is adhered.

"Recycled SAP particles" as used herein refers to SAP particles which have been separated from a solidified thermoplastic composition to which the SAP particles have been previously adhered. The SAP particles are preferably separated from the solidified thermoplastic composition by use of supercritical fluid, such as carbon dioxide, propane or mixtures thereof.

"Non-recycled SAP particles" as used herein refers to SAP particles which previously have not been separated from a solidified thermoplastic composition. The non-recycled SAP particles have preferably not been incorporated in any absorbent articles or in parts of absorbent articles (such as in absorbent cores) before they are used in the absorbent articles of the present invention. However, in certain embodiments, the non-recycled SAP particles have been regained from absorbent articles, wherein they have incorporated together with absorbent fibers and wherein the SAP particles have been immobilized only due to the close proximity to the absorbent fibers. The SAP particles are neither affixed to these absorbent fibers nor are they affixed to each other or to other materials (such as nonwoven webs) of the absorbent article. Examples of such absorbent articles are disposable diapers containing relatively large amounts of absorbent fibers in addition to the SAP particles.

"Airfelt" is used herein to refer to comminuted wood pulp, which is a form of cellulose fibers (absorbent fibers).

"Comprise," "comprising," and "comprises" are open ended terms, each specifies the presence of what follows, e.g., a component, but does not preclude the presence of other features, e.g., elements, steps, components known in the art, or disclosed herein.

"Disposable" is used in its ordinary sense to mean an article that is disposed or discarded after a limited number of usage events over varying lengths of time, for example, less than about 20 events, less than about 10 events, less than about 5 events, or less than about 2 events. A disposable absorbent article is most often disposed after single use.

"Diaper" refers to an absorbent article generally worn by infants and incontinent persons about the lower torso so as to encircle the waist and legs of the wearer and that is specifically adapted to receive and contain urinary and fecal waste.

"Pant" or "training pant", as used herein, refer to disposable garments having a waist opening and leg openings designed for infant or adult wearers. A pant may be placed in position on the wearer by inserting the wearer's legs into the leg openings and sliding the pant into position about a wearer's lower torso. A pant may be preformed by any suitable technique including, but not limited to, joining together portions of the article using refastenable and/or non-refastenable bonds (e.g., seam, weld, adhesive, cohesive bond, fastener, etc.). A pant may be preformed anywhere along the circumference of the article (e.g., side fastened, front waist fastened). While the terms "pant" or "pants" are used herein, pants are also commonly referred to as "closed diapers," "prefastened diapers," "pull-on diapers," "training pants," and "diaper-pants".

A "nonwoven web" is a manufactured sheet, web or batt of directionally or randomly orientated fibers, bonded by friction, and/or cohesion and/or adhesion, excluding paper and products which are woven, knitted, tufted, stitch-bonded incorporating binding yarns or filaments, or felted by wetmilling, whether or not additionally needled. The fibers may be of natural or man-made origin and may be staple or continuous filaments or be formed in situ. Commercially available fibers have diameters ranging from less than about 0.001 mm to more than about 0.2 mm and they come in several different forms such as short fibers (known as staple, or chopped), continuous single fibers (filaments or monofilaments), untwisted bundles of continuous filaments (tow), and twisted bundles of continuous filaments (yarn). Nonwoven webs can be formed by many processes such as meltblowing, spunbonding, solvent spinning, electrospinning, carding and airlaying. The basis weight of nonwoven webs is usually expressed in grams per square meter (gsm).

Absorbent Articles

In the following, a disposable diaper will be described as one example of an absorbent article of the present invention. It is however understood, that other disposable absorbent articles are also encompassed by the present invention, especially pants, training pants and sanitary napkins.

It should be understood, that the absorbent articles described herein may on the one hand be the articles, from which the SAP particles are recycled by separating them from a solidified thermoplastic composition. On the other hand, the absorbent articles described herein may be the articles, which comprise the absorbent cores of the present invention. These absorbent cores comprise recycled SAP particles.

FIG. 1 is a plan view of a diaper 210 according to a certain embodiment of the present invention. The diaper 210 is shown in its flat out, uncontracted state (i.e. without elastic induced contraction) and portions of the diaper 210 are cut away to more clearly show the underlying structure of the diaper 210. A portion of the diaper 210 that contacts a wearer is facing the viewer in FIG. 1. The diaper 210 generally may comprise a chassis 212 and an absorbent core 214 disposed in the chassis 212.

The chassis 212 of the diaper 210 in FIG. 1 comprises the main body of the diaper 210. The chassis 212 may comprise an outer covering 216 including a topsheet 218, which may be liquid pervious, and/or a backsheet 220, which may be liquid impervious. The absorbent core 214 may be encased between the topsheet 218 and the backsheet 220. The chassis 212 may also include side panels 222, elasticized leg cuffs 224, and an elastic waist feature 226.

The leg cuffs 224 and the elastic waist feature 226 may each typically comprise elastic members 228. One end portion of the diaper 210 is configured as a first waist region 230 of the diaper 210. An opposite end portion of the diaper 210 is configured as a second waist region 232 of the diaper 210. An intermediate portion of the diaper 210 is configured as a crotch region 234, which extends longitudinally between the first and second waist regions 230 and 232. The waist regions 230 and 232 may include elastic elements such that they gather about the waist of the wearer to provide improved fit and containment (elastic waist feature 226). The crotch region 234 is that portion of the diaper 210 which, when the diaper 210 is worn, is generally positioned between the wearer's legs.

The diaper 210 is depicted in FIG. 1 with its longitudinal axis 236 and its transverse axis 238. The periphery 240 of the diaper 210 is defined by the outer edges of the diaper 210 in which the longitudinal edges 242 run generally parallel to the longitudinal axis 236 of the diaper 210 and the end edges 244 run between the longitudinal edges 242 generally parallel to the transverse axis 238 of the diaper 210. The diaper 220 may also include such other features as are known in the art including front and rear ear panels, waist cap features, elastics and the like to provide better fit, containment and aesthetic characteristics.

In order to keep the diaper 210 in place about the wearer, at least a portion of the first waist region 230 may be attached by the fastening member 246 to at least a portion of the second waist region 232 to form leg opening(s) and an article waist. To this end, according to certain embodiments, the diaper 210 may be provided with a re-closable fastening system or may alternatively be provided in the form of a pant-type diaper. When the absorbent article is a diaper, it may comprise a re-closable fastening system joined to the chassis for securing the diaper to a wearer. The fastening system may include at least one fastening member 246 and at least one landing zone 248. When the absorbent article is a pant-type diaper, the article may comprise two side panels on each waist region 230, 232 joined to the chassis along the longitudinal edges of the side panels which face towards the longitudinal axis 236. The side panels of the first waist region 230 are further joined to the respective side panels of the second waist region 232 along their longitudinal edges facing away from the longitudinal axis 236 to form a pant.

Taking a cross section of FIG. 1 along the sectional line 2-2 of FIG. 1 and starting from the wearer facing side, the diaper 210 may comprise the topsheet 218, the components of the absorbent core 214, and the backsheet 220. Diaper 210 also comprises an acquisition system 250 disposed between the liquid permeable topsheet 218 and the wearer facing side of the absorbent core 214. The acquisition system 250 may be in direct contact with the absorbent core.

The acquisition system 250 may comprise a single layer or multiple layers, such as an upper acquisition layer 252 facing towards the wearer and a lower acquisition 254 layer facing the garment of the wearer. According to a certain embodiment, the acquisition system 250 may function to receive a surge of liquid, such as a gush of urine. In other words, the acquisition system 250 may serve as a temporary reservoir for liquid until the absorbent core 214 can absorb the liquid.

In a certain embodiment, the acquisition system 250 may comprise chemically cross-linked cellulose fibers and/or nonwoven webs.

The absorbent cores of the present invention may comprise SAP particles, wherein a part of the SAP particles are recycled. Recycling the SAP particles comprises separating contaminated superabsorbent polymer particles from a solidified thermoplastic composition. Preferably, the contaminated SAP particles are separated from the solidified thermoplastic composition by using a supercritical fluid comprising carbon dioxide, propane or mixtures thereof. Alternatively, the contaminated SAP particles can be separated from the solidified thermoplastic composition using Soxhlet extraction.

The recycled SAP particles preferably are more than 1 weight-%, more preferably more than 5 weight-% of the total amount of SAP particles comprised by the absorbent core. The recycled SAP particles may be less than 70 weight-%, preferably less than 50 weight-%, and still more preferably less than 50 weight-% or less than 20 weight-% of the total amount of SAP particles comprised by the absorbent core. In the most preferred embodiment, the recycled SAP particles are less than 15 weight-% of the total amount of SAP particles comprised by the absorbent core.

The remaining part of the SAP particles within the absorbent core is non-recycled SAP particles. Preferably, the recycled superabsorbent polymer particles and the non-recycled superabsorbent polymer particles have been mixed with each other prior to incorporating them in the absorbent core.

The absorbent cores comprising the recycled SAP particles are preferably comprised in absorbent articles selected from diapers, training pants, and sanitary napkins. These absorbent articles may further comprise SAP particles in other components of the article, such as the acquisition system. The SAP particles comprised in the acquisition system may partly be recycled SAP particles.

Certain embodiments of the present invention refer to absorbent cores comprising SAP particles, wherein at least a part of the SAP particles are recycled SAP particles. These absorbent cores are not comprised within absorbent articles. Rather, the absorbent cores may be sold separately, e.g. for replacing used absorbent cores in an absorbent article.

Supercritical Fluids

Figure 6:
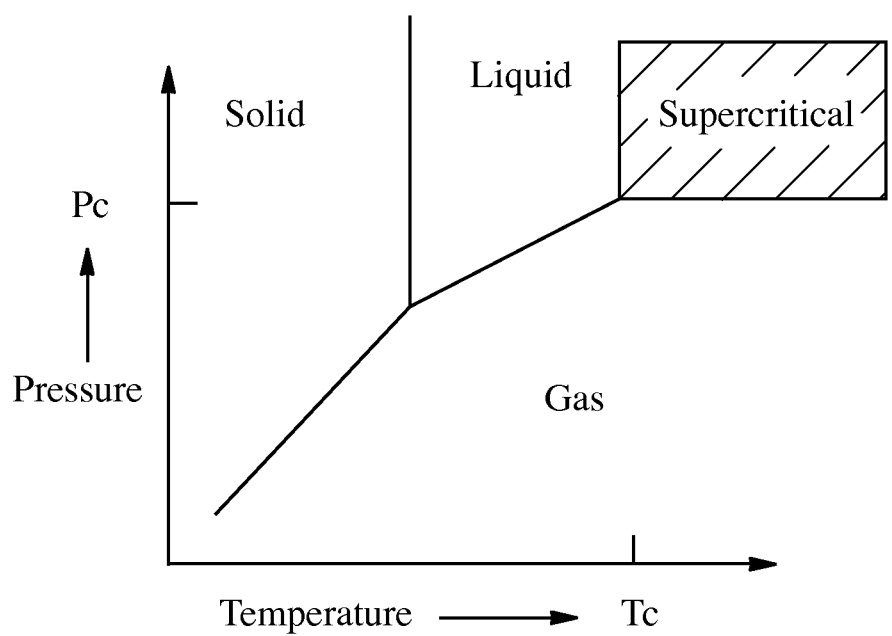
FIG. 6 is a diagram showing the state of a pure substance, plotting pressure versus temperature.

When a gas is compressed to a sufficiently high pressure, it becomes liquid. If, on the other hand, the gas is heated beyond a specific temperature, it can no longer be transferred to the liquid state by compression. This temperature is called the critical temperature and the corresponding vapor pressure is called the critical pressure. These values of temperature and pressure define a critical point, which is unique to a given substance. The state of the substance is called supercritical state when both the temperature and pressure exceed the critical point values, as shown in FIG. 6. Critical temperature and pressure values for carbon dioxide are 31.1° C. and 73.8 bar. For propane, the critical temperature and pressure values are 38.8° C. and 42.5 bar.

This supercritical fluid (SCF) takes on many of the properties of both gas and liquid. In the supercritical state, increasing the solvent capacity and varying the solvent properties can be achieved with relatively small changes in temperature and pressure. Due to its favorable diffusivity, viscosity, surface tension and other physical properties, SCFs are especially suitable as solvents for extraction. For example SC carbon dioxide has much higher diffusion rates and considerably higher viscosity compared to typical liquid solvents, such as ethanol, iso-propanol, or n-hexane.

Its low viscosity and low surface tension enable SCFs to penetrate a solid substance from which an active component is to be extracted.

Furthermore, in SCF extraction with $CO_2$, there is no solvent residue in the extract. For the present invention, $CO_2$ purity should be at least 99.95%. Also, its near ambient critical temperature makes it ideally suitable for thermo labile products. Due to its very low latent heat of vaporization, relatively low energy input is required for the extract separation. Furthermore the energy required for attaining the supercritical state of $CO_2$ is often less than the energy associated with distillation of conventional organic solvents. $CO_2$ required for the supercritical fluid extraction process is readily available, as it is e.g. obtained as a by-product from the fermentation process or fertilizer industry. So its use as an extractant does not cause any further increase in the amount of $CO_2$ present in the atmosphere. There is no additional "Green House effect" from using $CO_2$ as the SCF solvent. Moreover, $CO_2$ is readily available at low cost.

Method for Obtaining Recycled SAP Particles

The system used for carrying out the method of the present invention comprises at least one extractor, one precipitator and tubes connecting the extractor and the precipitator. Furthermore, the system should comprise a device, such as a pump, which maintains constant flow-rate and pressure of the supercritical fluid within the system. All components need to be combined in a closed system. The SCF passes through the extractor, leaves the extractor through at least one outlet (of the extractor) into the tubes and moves on to the precipitator through at least one inlet (of the precipitator). Upon expansion in the precipitator, the expanded gas (former SCF) leaves the precipitator through at least one outlet (of the precipitator) and passes back to the extractor through tubes. Before entering the extractor again through at least one inlet (of the extractor), the gas needs to be compressed to transfer it back into its supercritical state. Valves may serve to enable decoupling of the different components (e.g. extractor, precipitator) such that the extractor and/or precipitator can be isolated from the closed system to allow opening of these components without subjecting the complete system to ambient conditions. Optionally, the system may further comprise coolers (e.g. to cool the precipitator and/or to cool the gas within the tubes before it is transformed back to its supercritical state). The system may also comprise a heating device to maintain the supercritical fluid at the desired temperature.

To recycle the SAP particles, the SAP particles are placed in an appropriate container, herein called an extractor. At least a part of the SAP particles placed in the extractor are closely adhered to a solidified thermoplastic composition comprising at least 30 weight-% of a thermoplastic polymer based on the weight of the solidified thermoplastic composition. In most embodiments, the majority (i.e. more than 50%) of the SAP particles will be closely adhered to the solidified thermoplastic composition. However, more than 50%, e.g. more than 70% or more than 80% may be closely adhered to the solidified thermoplastic composition, or even more than 95%. To be closely adhered, it is sufficient that a relatively small part of the surface of the SAP particles has the solidified thermoplastic composition adhered to it while the remaining surface is free of the solidified thermoplastic composition. For the present invention such SAP particles will already regarded as being contaminated with the solidified thermoplastic composition. Typically, the SAP particles will be immobilized within a fibrous network of the solidified thermoplastic composition.

As the name already indicates, the extractor, wherein the contaminated SAP particles are placed, serves as an extraction vessel. The extractor may e.g. be an autoclave. The extractor needs to be hermetically sealable against ambient air to allow the appropriate pressure and temperature to build up.

The material placed in the extractor may be only the SAP particles to which solidified thermoplastic composition is adhered. However, it has been surprisingly found that the method of the present invention can also be carried out when the SAP particles with the closely adhered solidified thermoplastic composition are comprised within an absorbent core of an absorbent article while being subjected to the method of the present invention. The absorbent core may further to the contaminated SAP particles comprise nonwoven webs, airfelt and/or other liquid absorbing materials, such as absorbent foams. In one embodiment, the absorbent core comprises the contaminated SAP particles and one or more nonwoven webs.

In one embodiment, the absorbent core subjected to the method of the present invention will comprise at least 75 weight-% of SAP particles based on the total weight of the absorbent core. In another embodiment, the absorbent core will comprise at least 80 weight-% of SAP particles based on the total weight of the absorbent core. In still another embodiment, the absorbent core will comprise at least 90 weight-% of SAP particles based on the total weight of the absorbent core.

Further, in one embodiment, the absorbent core subjected to the method of the present invention will comprise less than 8 weight-% of the solidified thermoplastic composition based on the total weight of the absorbent core. In another embodiment, the absorbent core will comprise less than 6 weight-% of the solidified thermoplastic composition based on the total weight of the absorbent core. In still another embodiment, the absorbent core will comprise less than 5 weight-% of the solidified thermoplastic composition based on the total weight of the absorbent core.

Alternatively, the material subjected to the method of the present invention comprises further to the absorbent cores with the contaminated SAP particles also other components of an absorbent article, such as the acquisition system.

Moreover, the inventors of the present invention have found that complete absorbent articles, e.g. complete diapers, can be subjected to the method of the present invention. This eliminates the need to retrieve the absorbent cores from the absorbent articles before subjecting them to the method of the present invention. Thus, in a still further embodiment, complete absorbent articles, such as disposable diapers, training pants or sanitary napkins, are subjected to the method of the present invention. These absorbent articles comprise the SAP particles to which the solidified thermoplastic composition is adhered. The SAP particles are comprised inside the absorbent articles, i.e. the SAP particles with the adhered solidified thermoplastic composition are surrounded by other materials, such as nonwoven webs, films and/or airfelt. The complete absorbent articles may also comprise inks which have been used to provide a print on portions of the absorbent article (e.g. on the backsheet or the landing zone).

In one embodiment, the disposable absorbent article subjected to the method of the present invention comprises at least 25 weight-% of SAP particles based on the total weight of the disposable absorbent article. In another embodiment, the disposable absorbent article comprises at least 30 weight-% of SAP particles based on the total weight of the disposable absorbent article.

Further, in one embodiment, the disposable absorbent article subjected to the method of the present invention will comprise less than 3 weight-% of the solidified thermoplastic composition based on the total weight of the disposable absorbent article. In another embodiment, the disposable absorbent article will comprise less than 2.5 weight-% of the solidified thermoplastic composition based on the total weight of the disposable absorbent article. After the SAP particles with the adhered solidified thermoplastic composition have been placed in the extractor, at least one inlet and at least one outlet is connected to the extractor and the extractor is hermetically sealed against ambient air.

Supercritical fluid, such as supercritical carbon dioxide, is fed into the system and enters the extractor through the at least one inlet line. While passing through the extractor, the supercritical fluid also passes through the material comprised in the extractor.

Due to its low viscosity and high diffusion coefficient, the supercritical fluid can easily penetrate the material placed in the extractor, thus coming into close contact with the SAP particles to which the solidified thermoplastic composition is adhered, even if the SAP particles are comprised in an absorbent article. Passing though the material, the supercritical fluid extracts the solidified thermoplastic composition, which thereby is removed from the SAP particles little by little.

The supercritical fluid together with the extracted solidified thermoplastic composition leaves the extractor through the at least one outlet and passes through tubes into the precipitator. In the precipitator the supercritical fluid is allowed to expand to conditions below the supercritical temperature and pressure, e.g. supercritical carbon dioxide and/or propane is/are transferred back to the gaseous state. Upon expansion of the supercritical fluid, the extracted solidified thermoplastic composition precipitates in the precipitation vessel, as the gaseous carbon dioxide and/or propane can no longer serve as an extraction medium.

However, the chemical configuration of the solidified thermoplastic composition will most likely not be the same as the chemical configuration, which the solidified thermoplastic composition had while it was adhered to the SAP particles. For example, if the solidified thermoplastic composition is not a pure chemical compound but rather a mixture of different components, the different components may have at least partly been separated from each other upon extraction, possibly resulting in part of the formerly solidified thermoplastic composition being now in a liquid state (e.g. oil, if present).

Upon precipitation of the extracted material in the precipitator, the carbon dioxide and/or propane is regenerated, i.e. not "loaded" with the extracted material any longer. The carbon dioxide and/or propane leave the precipitator through at least one outlet and enter into the pipe leads it back to the precipitator. At its way back, the gas is compressed again until it has reached its supercritical state. Thereupon, the supercritical fluid can again enter the extractor wherein the SAP particles with the adhered solidified thermoplastic composition have been placed. As has been explained, the method of the present invention can be carried out in a closed system, where the carbon dioxide and/or the propane can be at least partially recycled and be re-used for many cycles, passing through the extractor with the contaminated SAP particles again and again.

Pressure and Temperature

As higher pressures are more difficult to facilitate, relatively low pressures are desirable from a process engineering and cost standpoint. However, it has been found that a relatively high pressure may make the method of the invention more efficient, possibly leading to a shorter time, during which the contaminated SAP particles have to be subjected to the supercritical fluid in order to remobilize SAP particles and free them from the solidified thermoplastic composition. Higher pressure means that more molecules of the supercritical fluid are present per given volume, thus enabling faster extraction. In the method of the present invention, the supercritical fluid may be under a pressure of from 100 bar to 600 bar, or from 150 bar to 450 bar or from 200 bar to 400 bar, or from 200 bar to 375 bar.

As carbon dioxide reaches its supercritical state at a pressure of 73.8 bar and at a temperature of 31.1° C., the temperature of the supercritical fluid should be at least 40° C. Temperatures below 40° C. may result in areas within the system having a temperature which is at least temporarily below the supercritical temperature of 31.1° C. Thus, to ensure process stability, the temperature should be at least 40° C. However, if propane is used as supercritical fluid (or a mixture which predominantly consists of propane), it may be desirable to have a temperature of at least 45° C. due to the slightly higher critical temperature of propane compared to carbon dioxide. Generally, it is desirable that the temperature of the supercritical fluid is from 40° C. to 100° C., preferably from 40° C. to 75° C. and more preferably from 40° C. to 60° C. Temperatures above 100° C. do not only increase the cost for running the system, but they may also have an adverse effect on the SAP particles, e.g. yellowing of the SAP particles.

If the contaminated SAP particles subjected to the method of the invention comprise odour control compounds, such as odour control particles comprising percarbonate and tetra acetyl ethylene diamine, the odour control compound may deteriorate at elevated temperatures. For example, percarbonate may decompose, setting free hydrogen peroxide. However, for the present invention it is not critical whether the odor control compound decomposes and is inactivated upon being subjected to the present invention, as long as the SAP particles are not adversely affected.

If it is desired to maintain activity of the odor control compounds, the temperature, upon which the odor control compounds are deactivated can be determined and the temperature, at which the contaminated SAP particles comprising the odor control compounds, are subjected to supercritical fluid, can be chosen accordingly to avoid deactivation (as long as no temperature below 40° C. is required—in these embodiments the activity of the odor control compound cannot be maintained). For example, percarbonate should not be subjected to temperatures above 60° C. in order to avoid decomposition and liberation of hydrogen peroxide.

Amount of Supercritical Fluid and Time

The supercritical fluid is provided to the extractor comprising the contaminated SAP particles as a continuous stream. The stream enters the extractor through the at least one inlet and leaves the extractor through the at least one outlet.

Generally, it is desirable that the amount of supercritical fluid is many times the amount of solidified thermoplastic composition, which is to be extracted in order to separate the solidified thermoplastic composition from the SAP particles.

The amount which is actually needed inter alia depends on whether or not co-solvents are applied besides the carbon dioxide and/or propane. If co-solvents are used, lower amounts of supercritical fluid may be sufficient. If pure carbon dioxide is used, the amount of supercritical fluid to flow through the extractor is desirable from 50 time to 500 times (by weight), more preferably from 70 times to 150 times (by weight) the amount of the solidified thermoplastic composition.

If pure propane or a mixture of (only) carbon dioxide and propane (i.e. with no additional co-solvent) is used, the amount of supercritical fluid to flow through the extractor is desirable from 40 time to 300 times (by weight), more preferably from 50 times to 100 times (by weight) the amount of the solidified thermoplastic composition. If a mixture of carbon dioxide and propane is used, it is preferred that the mixture consists of from 60 weight-% to 95 weight-% of carbon dioxide and from 5 weight-% to 40 weight-% of propane based on the total weight of supercritical fluid, more preferably of from 75 weight-% to 95 weight-% of carbon dioxide and from 5 weight-% to 25 weight-% of propane.

If co-solvents are used, it may be sufficient to use from 20 times to 120 times (by weight) the amount of supercritical fluid to flow through the extractor compared to the amount of solidified thermoplastic composition, preferably from 20 times to 80 times (by weight) and more preferably from 20 times to 60 times.

The time, for which the contaminated SAP particles have to be subjected to the supercritical fluid treatment in order to separate the SAP particles from the solidified thermoplastic composition will inter alia depend on the pressure of the supercritical fluid, on the flow rate and on which supercritical fluid is used.

The contaminated SAP particles may generally be subjected to the supercritical fluid for from 15 minutes to 180 minutes, or from 30 minutes to 90 minutes.

The method of the present invention may be carried out in a batch process or in a quasi-continuous process. A "batch process" as used herein means that a given amount of SAP particles with adhered solidified thermoplastic composition is placed in the extractor and treated with supercritical fluid until the SAP particles have been completely separated from the solidified thermoplastic composition. Thereafter, the SAP particles (and other parts of the disposable absorbent articles/ complete absorbent articles, if present) are taken out of the extractor and a new amount of SAP particles with adhere solidified thermoplastic composition (i.e. a new batch) is placed in the extractor. Also, it may be necessary to empty the precipitator, if there is too much precipitated material resulting from extraction of the solidified thermoplastic composition. However, the present invention also encompasses methods wherein the SAP particles are treated in a quasi-continuous process. "Quasi-continuous" as used herein means that more than one extractor is comprised by the system. The system is set up appropriately to allow one or more extractors to be disengaged from the system such that they can be opened while leaving the remaining system—with the other extractor(s)—unaffected.

Supercritical Fluid Used in the Method of the Present Invention

For the present invention, the supercritical fluid will comprise carbon dioxide, propane or mixtures thereof. Both, carbon dioxide and propane are non-polar solvents.

In general the extractability of the compounds with a SCF depends on the occurrence of the individual functional groups in these compounds, their molecular weights and polarity.

Many non-polar organic solvents (such as carbon dioxide or propane) are able to dissolve polar substances. When comparing a polar and non-polar molecule with similar molar masses, the polar molecule generally has a higher boiling point, because of the dipole-dipole interaction between polar molecules. The most common form of such polar interaction is the hydrogen bond, which is also known as the H-bond.

In order to further improve the solving power of the SCF used in the method of the present invention, one or more co-solvent may be used in addition to the carbon dioxide, propane or carbon dioxide/propane mixture. Thus, in one embodiment of the present invention, the SCF comprises one or more co-solvents in addition to the carbon dioxide, propane or carbon dioxide/propane mixture. Also, in one embodiment of the present invention, the SCF is a mixture of carbon dioxide and one or more co-solvents. In an alternative embodiment of the present invention, the SCF consists of carbon dioxide.

The co-solvents for use in the method of the present invention and comprised by the SCF, which is provided to the extractor may be selected from the group consisting of ethanol, ethyl acetate, butane, butyl acetate, acetone, nitrous oxide, carbon dioxide, nitrogen, water, and mixtures thereof. The amount of the co-solvent (or the total amount of co-solvents, if more than one co-solvent is used) comprised by the SCF which is provided to the extractor may be from 0.1 weight-% to 40 weight-%, preferably from 0.5 weight-% to 30 weight-%, and more preferably from 1 weight-% to 20 weight-% based on the total weight of supercritical fluid. All supercritical fluids are completely miscible with each other so for a mixture a single phase can be guaranteed if the critical point of the mixture is exceeded.

It has been found that it is not only possible to carry out the method of the present invention with complete absorbent cores and even with complete absorbent articles comprising the absorbent cores. Surprisingly, it has been further found that the method may even work better if complete absorbent cores or complete or at least partially assembled absorbent articles are used.

Without wishing to be bound by theory, it is believed that one reason for this improvement is that certain compounds comprised by the absorbent core or absorbent article act as co-solvents. For example, absorbent articles typically comprise adhesives which are used to bond the different webs and materials of the article to each other. Moreover, many absorbent articles have elastic members, which may comprise substances useful as co-solvents. Other compounds, which often find use in absorbent articles, are surfactants (e.g. to render the topsheet hydrophilic). Such surfactants may also work as co-solvents for the method of the invention. It should be understood that for the present invention these "inherent co-solvents" are not taken into consideration when referring to co-solvents, which are used in the supercritical fluid (especially when determining preferred compounds and amounts of co-solvents). Instead, when referring to co-solvents, only those compounds are referred to, which are consciously and in a controlled manner, mixed into the supercritical fluid.

The SCF does not only penetrate through the contaminated SAP particles but penetrates through the absorbent article as a whole. Thus, not only the solidified thermoplastic composition is extracted, but also other compounds, such as adhesives used in other areas of the article, surfactants, inks and possible elastifiers in elastic elements are affected by extraction. This can be easily demonstrated by the fact, that the absorbent article is—at least to a certain degree-demounted and deconstructed into its individual elements, such as topsheet, backsheet, tapes etc., which have formerly be assembled into the absorbent article.

Thus, as other compounds are extracted, they are set free and are comprised in the stream of SCF, passing with the SCF through the extractor, thereby also coming into contact with the contaminated SAP particles. Contrary to supercritical CO2 and propane, many of these compounds are polar substances, which may support extraction of the solidified thermoplastic composition, especially if the solidified thermoplastic composition comprises substances (i.e. substances additionally to the polymer of the solidified thermoplastic composition), which are rather polar. However, rather non-polar compounds extracted from the absorbent core or absorbent article of course also have the potential of a co-solvent.

Alternatively to the method set out above, the recycled SAP particles can be obtained from contaminated SAP particles by Soxhlet extraction as is well known in the art. Suitable solvents for Soxhlet extraction are hexan, chloroform, acetone or ethylacetate.

Solidified Thermoplastic Composition

The solidified thermoplastic composition of the present invention, which is adhered to the SAP particles, may be an adhesive, preferably a hot melt adhesive. The adhesive may have been initially applied to immobilize the SAP particles. Such immobilization of the SAP particles may generally be required in embodiments, wherein the absorbent core of a disposable absorbent article comprises little (e.g. less than 10% by total weight of the absorbent material) of airfelt or wherein the absorbent core comprises no airfelt at all. Typically, the SAP particles are laid down on a nonwoven carrier web, where they are immobilized to ensure they stay in place during manufacture, storage and use of the absorbent article.

It should be understood that the solidified thermoplastic composition may not be in its solidified state during application onto the SAP particles but the solidified thermoplastic composition may be heated up to a temperature where it is semi-fluid or fluid in order to facilitate application on the SAP particles. Thus, a solidified thermoplastic composition in the present invention refers to a composition which is solidified at room temperature. Generally, the solidified thermoplastic composition in the present invention should also be solid at and slightly above in-use temperatures of absorbent articles, i.e. at a temperature up to about 40° C. (even though parts of the absorbent article will have lower in-use temperatures). The solidified thermoplastic composition readily immobilizes the SAP particles and holds them in place.

The solidified thermoplastic composition may at least partly be applied in fibrous form onto the SAP particles (e.g. by spraying) while the solidified thermoplastic composition has been transferred into a semi-fluid or fluid state (upon heating) to form a kind of a fibrous adhesive-network around the SAP particles. If the solidified thermoplastic composition is applied in fibrous form, the fibers will typically have an average thickness of about 1 to about 50 micrometers or about 1 to about 35 micrometers and an average length of about 5 mm to about 50 mm or about 5 mm to about 30 mm.

The solidified thermoplastic composition may comprise a single thermoplastic polymer or a blend of thermoplastic polymers. The thermoplastic polymer(s) may have a softening point, as determined by the ASTM Method D-36-95 "Ring and Ball", in the range between 50° C. and 300° C., The thermoplastic polymer(s) preferably have a molecular weight (weight average Mw in Dalton) of more than 10,000 and a glass transition temperature (Tg) below room temperature (25° C.) or $-6°$ C.$>Tg<16°$ C. Typical concentrations of the thermoplastic polymer(s) in the solidified thermoplastic composition are in the range of 30 weight-% to about 50 weight-% by weight, preferably 30 weight-% to about 40 weight-% by weight. Preferably, the thermoplastic polymers of the solidified thermoplastic composition are immiscible with water (in amounts above 5% by weight of the solidified thermoplastic composition).

Exemplary thermoplastic polymers are block copolymers—such as styrenic block copolymers—including A-B-A triblock structures, A-B diblock structures and (A-B)n radial block copolymer structures wherein the A blocks are non-elastomeric polymer blocks, typically comprising polystyrene, and the B blocks are unsaturated conjugated diene or (partly) hydrogenated versions of such. The B block is typically isoprene, butadiene, ethylene/butylene (hydrogenated butadiene), ethylene/propylene (hydrogenated isoprene), and mixtures thereof. Preferably, the polymer in the solidified thermoplastic composition is a styrene-isoprene-styrene (SIS) block copolymer, a styrene-butadiene-styrene (SBS) block copolymer or mixtures thereof. Styrene-block-copolymers are often used in adhesives which find application in absorbent articles. In embodiments of the present invention wherein the solidified thermoplastic composition comprises more than one polymer, the solid composition preferably comprises at least 30 weight-% of a styrene-block-copolymer, such as a styrene isoprene block copolymer, based on the total weight of the solidified thermoplastic composition.

Other suitable thermoplastic polymers that may be employed are metallocene polyolefins, which are ethylene polymers prepared using single-site or metallocene catalysts. Therein, at least one comonomer can be polymerized with ethylene to make a copolymer, terpolymer or higher order polymer. Also applicable are amorphous polyolefins or amorphous polyalphaolefins (APAO) which are homopolymers, copolymers or terpolymers of C2 to C8 alpha olefins. Besides the at least 30 weight-% of the thermoplastic polymer, the solidified thermoplastic composition may further comprise tackifying resins and/or oils. Furthermore, the solidified thermoplastic composition may comprise relatively small amounts of additives, such as antioxidants, fillers (e.g. sand and/or silicates) and/or surfactants.

The amount of tackifying resins, if present in the solidified thermoplastic composition, will typically be from 1 weight-% to 60 weight-%, preferably from 5 weight-% to 40 weight-% and more preferably from 5 weight-% to 30 weight-% based on the weight of the solidified thermoplastic composition. The amount of oils, if present in the solidified thermoplastic composition, will typically be from 1 weight-% to 40 weight-%, preferably from 5 weight-% to 30 weight-%, or from 5 weight-% to 20 weight-% based on the weight of the solidified thermoplastic composition. The solidified thermoplastic composition of the present invention may comprise more than one oil (i.e. different oils) and/or may comprise more than one tackifying resin (i.e. different tackifying resins). The overall amount of additives, if used in the solidified thermoplastic composition, may not more than 15 weight-%, preferably not more than 10 weight-%, more preferably not more than 8 weight-% based on the weight of the solidified thermoplastic composition.

A resin for the present invention is a hydrocarbon secretion of many plants, particularly coniferous trees, e.g. rosin esters (which are often used as tackifiers). The term resin herein is also used for synthetic resins of similar properties. Synthetic resins are materials with similar properties to natural resins—viscous liquids capable of hardening. They are typically manufactured by esterification or soaping of organic compounds. The classic variety is epoxy resin. The tackifying resin of the solidified thermoplastic composition has typically a weight average Mw (in Dalton) below 5,000. The Tg will usually be above room temperature. "Oil" for the present invention is any substance that is liquid at ambient temperatures and is hydrophobic but soluble in organic solvents. Oils have a high carbon and hydrogen content and are non-polar substances. Oils useful for the solidified thermoplastic composition of the present invention are mineral oils. In one embodiment, the oil is petrolatum oil, for example paraffinic oil, napthenic oil or mixtures thereof. The oil may have a low weight average Mw (in Dalton) of less than 1,000. The Tg will preferably be below room temperature (25° C.).

Examples for solidified thermoplastic compositions of the present invention are the following hot melt adhesives: Bostik Findley H2401, an elastic adhesive; Lunatack D 3155 B Zeropack and D 3166 Zeropack from H. B. Fuller; HL 1358 from H. B. Fuller; Dispomelt (DM526 and DM519 A) sold by National Starch.

One example of an absorbent article comprising an absorbent core with SAP particles, which have been immobilized with a solidified thermoplastic composition of the present invention is Pampers "Cruisers" diapers as sold by the Procter and Gamble Company in the USA in February 2011. These diapers do not contain any recycled SAP particles.

Superabsorbent Polymer Particles

The SAP particles may be of numerous shapes. The term "particles" refers to granules, fibers, flakes, spheres, powders, platelets and other shapes and forms known to persons skilled in the art of SAP particles. E.g. the particles can be in the form of granules or beads, having a particle size from about 10 μm to about 1000 μm, preferably from about 100 μm to about 1000 μm, even more preferably from about 150 μm to about 850 μm and most preferably from about 150 μm to about 500 μm. In another embodiment, the SAP particles can be in the shape of fibers, i.e. elongated, acicular SAP particles. In those embodiments, the SAP fibers have a minor dimension (i.e. diameter of the fiber) of less than about 1 mm, usually less than about 500 μm, and preferably less than 250 μm down to 50 μm. The length of the fibers is preferably about 3 mm to about 100 mm. The fibers can also be in the form of a long filament that can be woven. Preferred SAP particles of the present invention are spherical-like particles. According to the present invention and in contrast to fibers, "spherical-like particles" have a longest and a smallest dimension with a particulate ratio of longest to smallest particle dimension in the range of 1-5, where a value of 1 would equate a perfectly spherical particle and 5 would allow for some deviation from such a spherical particle.

The SAP particles useful in the present invention include a variety of water-insoluble, but water-swellable polymers capable of absorbing large quantities of fluids. Such polymers materials are generally known in the art and include all those well-known polymers used or deemed useful in the context of disposable absorbent article technology.

Preferred polymer materials for use in making SAP particles are slightly network cross linked polymers of partially neutralized polyacrylic acids and starch derivatives thereof. Starch-based SAP particles are also encompassed in the present invention. Preferably, the SAP particles comprise from 25% to 95% by weight, more preferably from 50% to 80% by weight, neutralized, slightly network cross-linked, polyacrylic acid. Network cross-linking renders the polymer substantially water-insoluble and, in part, determines the absorptive capacity and extractable polymer content characteristics of the hydrogel-forming absorbent polymers.

While the SAP is preferably of one type (i.e., homogeneous), mixtures of polymers can also be used in the present invention. The SAP particles can also comprise mixtures with low levels of one or more additives, such as for example powdered silica, surfactants, adhesive, binders, and the like. Furthermore, the SAP particles can comprise a gradient in particle size or can comprise a certain range of particle size.

The SAP particles to be used in absorbent articles of the present invention preferably are mixtures of recycled SAP particles and non-recycled SAP particles.

Many of the formerly known SAP particles exhibited gel blocking. "Gel blocking" occurs when particles of the SAP are wetted and the particles swell so as to inhibit fluid transmission to other zones or regions of the absorbent structure. Wetting of these other regions of the absorbent core therefore takes place via a very slow diffusion process. In practical terms, this means acquisition of fluids by the absorbent structure is much slower than the rate at which fluids are discharged, especially in gush situations. Leakage from the absorbent article can take place well before the particles of SAP in the absorbent core are even close to being fully saturated or before the fluid can diffuse or wick past the "blocking" particles into the rest of the absorbent core.

One commonly applied way to reduce gel blocking is to make the particles stiffer, which enables the SAP particles to retain their original shape thus creating or maintaining void spaces between the particles. A well-known method to increase stiffness is to covalently cross-link the carboxyl groups exposed on the surface of the SAP particles. This method is commonly referred to as surface cross-linking.

The SAP particles may have a permeability at equilibrium expressed as UPM (Urine Permeability Measurement) value greater than 80, preferably greater than 100. The UPM value may be less than 300, preferably less than 150, more preferably less than 120 UPM units, where 1 UPM unit is $1 \times 10^{-7}$ $(cm^3 \cdot s)/g$.

The UPM value is measured according to the UPM Test method set out below. This method is closely related to the SFC test method of the prior art. The UPM Test method typically measures the flow resistance of a preswollen layer of superabsorbent polymer particles, i.e. the flow resistance is measured at equilibrium. Therefore, such SAP particles having a high UPM value exhibit a high permeability when a significant volume of the absorbent article is already wetted by the liquid exudates. These embodiments exhibit good absorption properties not only at the first gush but also at the subsequent gushes.

In some embodiments, the SAP particles may have a FSR (Free Swell Rate) of more than 0.1 g/g/s, or of from 0.1 to 2 g/g/s, preferably from 0.3 to 1 g/g/s, more preferably from 0.3 to 0.6 g/g/s, even more preferably from 0.4 to 0.6 g/g/s.

The Free Swell Rate of the SAP particles is measured according to the FSR test method set out below. SAP particles having high free swell rate values will be able to absorb liquid, relatively quickly. No external pressure is applied to the gel bed in order to measure the free swell rate.

The SAP particles may have a CRC (centrifuge retention capacity) value of more than 20 g/g, preferably more than 24 g/g, or of from 20 to 50 g/g, preferably from 20 to 40 g/g, more preferably from 24 to 30 g/g, as measured according to EDANA method WSP 241.2-05. The CRC measures the liquid absorbed by the SAP particles for free swelling in excess liquid. SAP particles having a high CRC value are preferred since less SAP particles are needed to facilitate a required overall capacity for liquid absorption.

For the present invention, the UPM value of the recycled SAP particles preferably does not decrease by more than 40%, preferably not more than 35% and still more preferably not more than 30% during the process of recycling contaminated SAP particles. The recycled SAP particles preferably have an UPM value of 60% to 95% compared to the UPM value of the non-recycled SAP particles.

In absorbent articles of the present invention, comprising recycled and non-recycled SAP particles, the recycled SAP particles may have an UPM value of at least 50 ($10^{-7}$ (cm$^3$·s/g)), preferably at least 60 ($10^{-7}$ (cm$^3$·s)/g) and the non-recycled SAP particles may have an UPM value of at least 80 ($10^{-7}$ (cm$^3$·s)/g), preferably at least 100 ($10^{-7}$ (cm$^3$·s)/g).

Test Methods for Determining UPM and FSR

The following test methods can be used for non-recycled as well as for recycled SAP particles.

Urine Permeability Measurement (UPM) Test method

Urine Permeability Measurement System

This method determined the permeability of a swollen hydrogel layer 1318 formed from swollen SAP particles. The equipment used for this method is described below. This method is closely related to the SFC (Salt Flow Conductivity) test method of the prior art.

Figure 2:
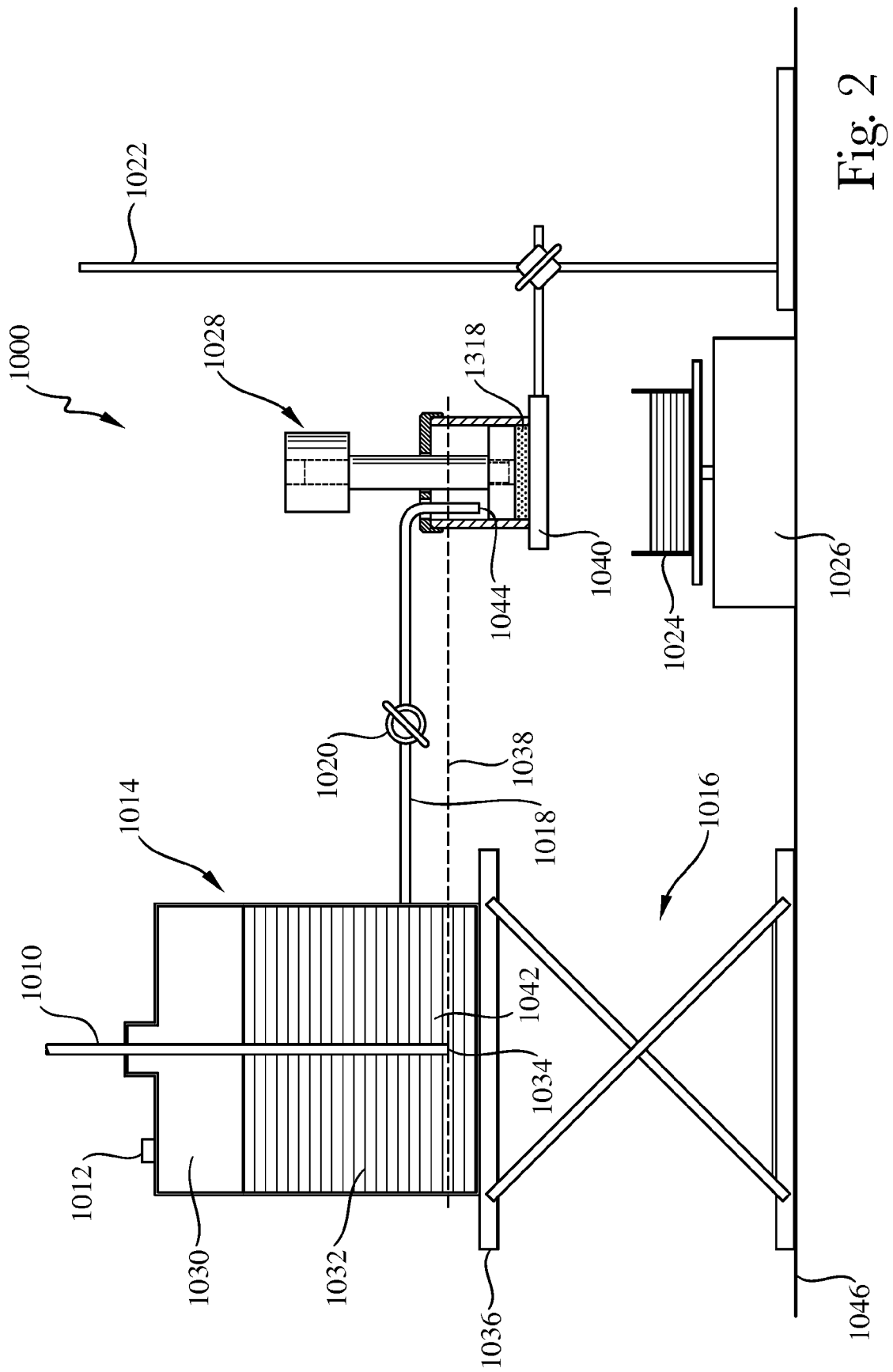
FIG. 2 is a partial cross-sectional side view of a suitable permeability measurement system for conducting the Urine Permeability Measurement Test.

FIG. 2 shows permeability measurement system 1000 set-up with the constant hydrostatic head reservoir 1014, open-ended tube for air admittance 1010, stoppered vent for refilling 1012, laboratory jack 1016, delivery tube 1018, stopcock 1020, ring stand support 1022, receiving vessel 1024, balance 1026 and piston/cylinder assembly 1028.

Figure 3:
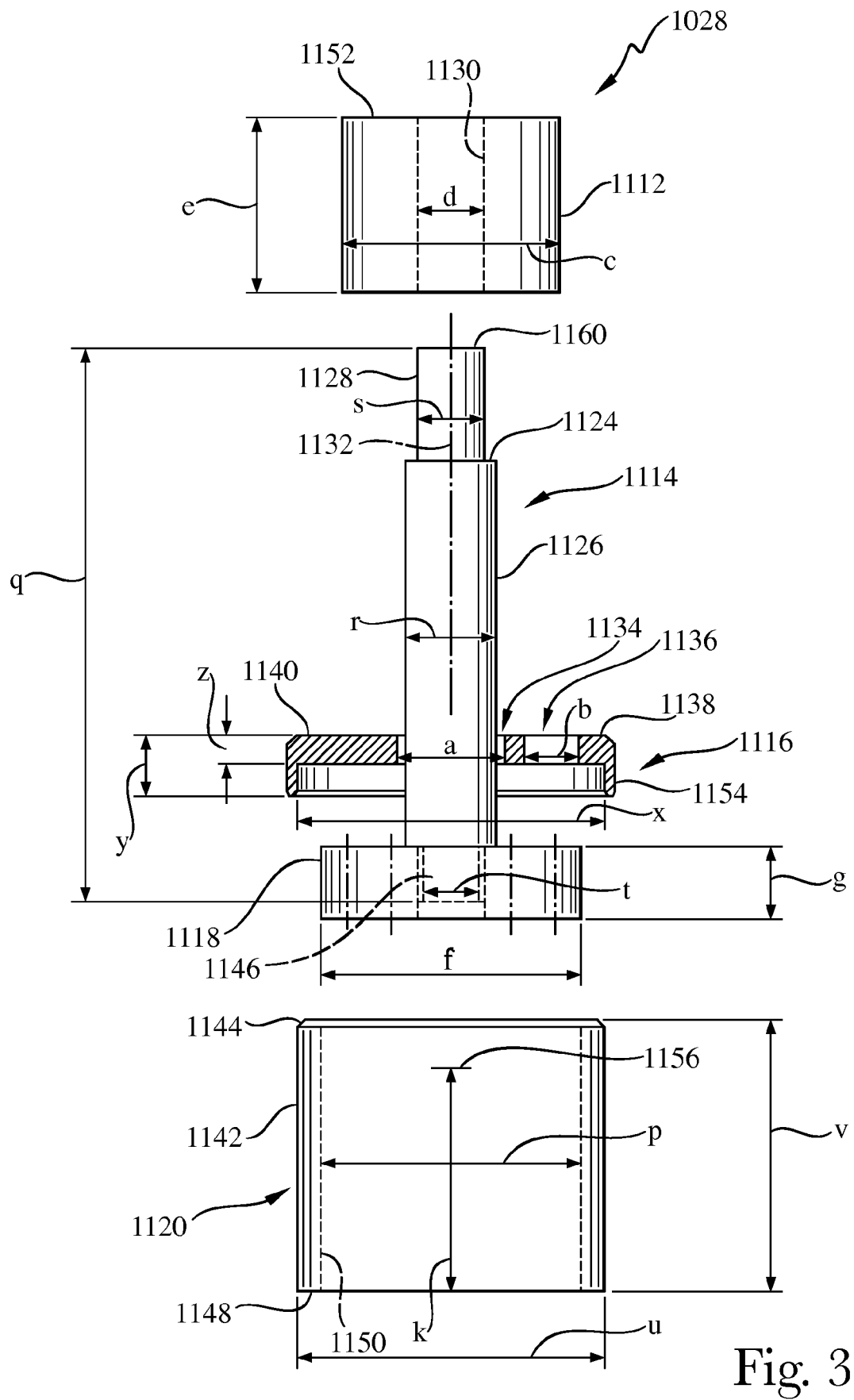
FIG. 3 is a cross-sectional side view of a piston/cylinder assembly for use in conducting the Urine Permeability Measurement Test.
Figure 4:
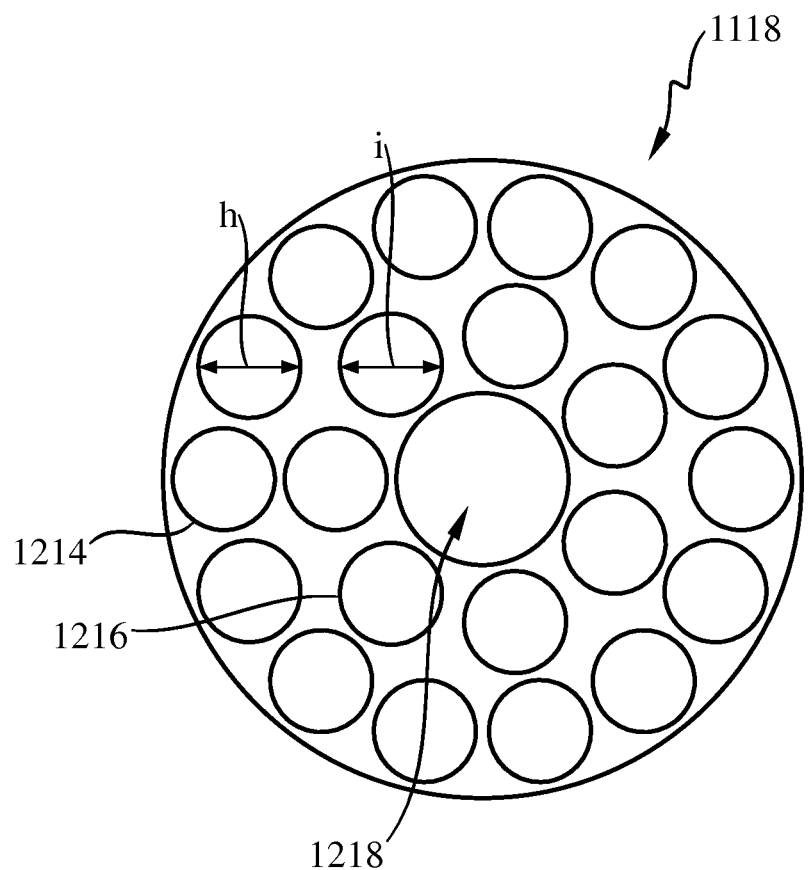
FIG. 4 is a top view of a piston head suitable for use in the piston/cylinder assembly shown in FIG. 3.

FIG. 3 shows the piston/cylinder assembly 1028 comprising a metal weight 1112, piston shaft 1114, piston head 1118, lid 1116, and cylinder 1120. The cylinder 1120 is made of transparent polycarbonate (e.g., Lexan®) and has an inner diameter p of 6.00 cm (area=28.27 cm2) with inner cylinder walls 1150 which are smooth. The bottom 1148 of the cylinder 1120 is faced with a US. Standard 400 mesh stainless-steel screen cloth (not shown) that is bi-axially stretched to tautness prior to attachment to the bottom 1148 of the cylinder 1120. The piston shaft 1114 is made of transparent polycarbonate (e.g., Lexan®) and has an overall length q of approximately 127 mm. A middle portion 1126 of the piston shaft 1114 has a diameter r of 21.15 mm. An upper portion 1128 of the piston shaft 1114 has a diameter s of 15.8 mm, forming a shoulder 1124. A lower portion 1146 of the piston shaft 1114 has a diameter t of approximately ⅝ inch and is threaded to screw firmly into the center hole 1218 (see FIG. 4) of the piston head 1118. The piston head 1118 is perforated, made of transparent polycarbonate (e.g., Lexan®), and is also screened with a stretched US. Standard 400 mesh stainless-steel screen cloth (not shown). The weight 1112 is stainless steel, has a center bore 1130, slides onto the upper portion 1128 of piston shaft 1114 and rests on the shoulder 1124. The combined weight of the piston head 1118, piston shaft 1114 and weight 1112 is 596 g (±6 g), which corresponds to 0.30 psi over the area of the cylinder 1120. The combined weight may be adjusted by drilling a blind hole down a central axis 1132 of the piston shaft 1114 to remove material and/or provide a cavity to add weight. The cylinder lid 1116 has a first lid opening 1134 in its center for vertically aligning the piston shaft 1114 and a second lid opening 1136 near the edge 1138 for introducing fluid from the constant hydrostatic head reservoir 1014 into the cylinder 1120.

A first linear index mark (not shown) is scribed radially along the upper surface 1152 of the weight 1112, the first linear index mark being transverse to the central axis 1132 of the piston shaft 1114. A corresponding second linear index mark (not shown) is scribed radially along the top surface 1160 of the piston shaft 1114, the second linear index mark being transverse to the central axis 1132 of the piston shaft 1114. A corresponding third linear index mark (not shown) is scribed along the middle portion 1126 of the piston shaft 1114, the third linear index mark being parallel with the central axis 1132 of the piston shaft 1114. A corresponding fourth linear index mark (not shown) is scribed radially along the upper surface 1140 of the cylinder lid 1116, the fourth linear index mark being transverse to the central axis 1132 of the piston shaft 1114. Further, a corresponding fifth linear index mark (not shown) is scribed along a lip 1154 of the cylinder lid 1116, the fifth linear index mark being parallel with the central axis 1132 of the piston shaft 1114. A corresponding sixth linear index mark (not shown) is scribed along the outer cylinder wall 1142, the sixth linear index mark being parallel with the central axis 1132 of the piston shaft 1114. Alignment of the first, second, third, fourth, fifth, and sixth linear index marks allows for the weight 1112, piston shaft 1114, cylinder lid 1116, and cylinder 1120 to be re-positioned with the same orientation relative to one another for each measurement.

The cylinder 1120 specification details are:
Outer diameter u of the Cylinder 1120: 70.35 mm
Inner diameter p of the Cylinder 1120: 60.0 mm
Height v of the Cylinder 1120: 60.5 mm
The cylinder lid 1116 specification details are:
Outer diameter w of cylinder lid 1116: 76.05 mm
Inner diameter x of cylinder lid 1116: 70.5 mm
Thickness y of cylinder lid 1116 including lip 1154: 12.7 mm
Thickness z of cylinder lid 1116 without lip 1154: 6.35 mm
Diameter a of first lid opening 1134: 22.25 mm
Diameter b of second lid opening 1136: 12.7 mm
Distance between centers of first and second lid openings 1134 and 1136: 23.5 mm
The weight 1112 specification details are:
Outer diameter c: 50.0 mm
Diameter d of center bore 1130: 16.0 mm
Height e: 39.0 mm
The piston head 1118 specification details are
Diameter f: 59.7 mm
Height g: 16.5 mm
Outer holes 1214 (14 total) with a 9.65 mm diameter h, outer holes 1214 equally spaced with centers being 47.8 mm from the center of center hole 1218
Inner holes 1216 (7 total) with a 9.65 mm diameter i, inner holes 1216 equally spaced with centers being 26.7 mm from the center of center hole 1218
Center hole 1218 has a diameter j of ⅝ inches and is threaded to accept a lower portion 1146 of piston shaft 1114.

Prior to use, the stainless steel screens (not shown) of the piston head 1118 and cylinder 1120 should be inspected for clogging, holes or over-stretching and replaced when necessary. A urine permeability measurement apparatus with damaged screen can deliver erroneous UPM results, and must not be used until the screen has been replaced.

A 5.00 cm mark 1156 is scribed on the cylinder 1120 at a height k of 5.00 cm (±0.05 cm) above the screen (not shown) attached to the bottom 1148 of the cylinder 1120. This marks the fluid level to be maintained during the analysis. Maintenance of correct and constant fluid level (hydrostatic pressure) is critical for measurement accuracy.

A constant hydrostatic head reservoir 1014 is used to deliver salt solution 1032 to the cylinder 1120 and to maintain the level of salt solution 1032 at a height k of 5.00 cm above the screen (not shown) attached to the bottom 1148 of the cylinder 1120. The bottom 1034 of the air-intake tube 1010 is positioned so as to maintain the salt solution 1032 level in the cylinder 1120 at the required 5.00 cm height k during the measurement, i.e., bottom 1034 of the air tube 1010 is in approximately same plane 1038 as the 5.00 cm mark 1156 on the cylinder 1120 as it sits on the support screen (not shown) on the ring stand 1040 above the receiving vessel 1024. Proper height alignment of the air-intake tube 1010 and the 5.00 cm mark 1156 on the cylinder 1120 is critical to the analysis. A suitable reservoir 1014 consists of a jar 1030 containing a horizontally oriented L-shaped delivery tube 1018 for fluid delivery, a vertically oriented open-ended tube 1010 for admitting air at a fixed height within the constant hydrostatic head reservoir 1014, and a stoppered vent 1012 for re-filling the constant hydrostatic head reservoir 1014. Tube 1010 has an internal diameter of 12.5 mm±0.5 mm. The delivery tube 1018, positioned near the bottom 1042 of the constant hydrostatic head reservoir 1014, contains a stopcock 1020 for starting/stopping the delivery of salt solution 1032. The outlet 1044 of the delivery tube 1018 is dimensioned to be inserted through the second lid opening 1136 in the cylinder lid 1116, with its end positioned below the surface of the salt solution 1032 in the cylinder 1120 (after the 5.00 cm height of the salt solution 1032 is attained in the cylinder 1120). The air-intake tube 1010 is held in place with an o-ring collar (not shown). The constant hydrostatic head reservoir 1014 can be positioned on a laboratory jack 1016 in order to adjust its height relative to that of the cylinder 1120. The components of the constant hydrostatic head reservoir 1014 are sized so as to rapidly fill the cylinder 1120 to the required height (i.e., hydrostatic head) and maintain this height for the duration of the measurement. The constant hydrostatic head reservoir 1014 must be capable of delivering salt solution 1032 at a flow rate of at least 3 g/sec for at least 10 minutes.

The piston/cylinder assembly 1028 is positioned on a 16 mesh rigid stainless steel support screen (not shown) (or equivalent) which is supported on a ring stand 1040 or suitable alternative rigid stand. This support screen (not shown) is sufficiently permeable so as to not impede salt solution 1032 flow and rigid enough to support the stainless steel mesh cloth (not shown) preventing stretching. The support screen (not shown) should be flat and level to avoid tilting the piston/cylinder assembly 1028 during the test. The salt solution 1032 passing through the support screen (not shown) is collected in a receiving vessel 1024, positioned below (but not supporting) the support screen (not shown). The receiving vessel 1024 is positioned on the balance 1026 which is accurate to at least 0.01 g. The digital output of the balance 1026 is connected to a computerized data acquisition system (not shown).

Preparation of Reagents (not Illustrated)

Figure 5:
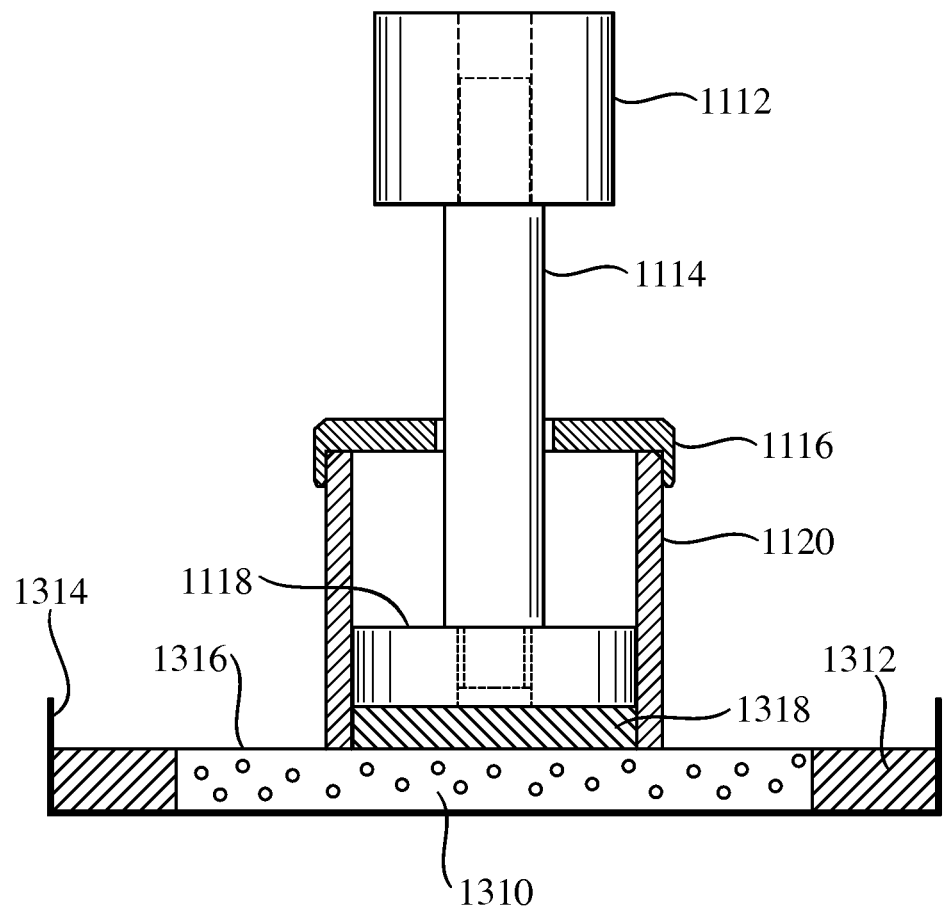
FIG. 5 is a cross-sectional side view of the piston/cylinder assembly of FIG. 3 placed on fritted disc for the swelling phase.

Jayco Synthetic Urine (JSU) 1312 (see FIG. 5) is used for a swelling phase (see UPM Procedure below) and 0.118 M Sodium Chloride (NaCl) Solution is used for a flow phase (see UPM Procedure below). The following preparations are referred to a standard 1 liter volume.

For preparation of volumes other than 1 liter, all quantities are scaled accordingly.

JSU: A 1 L volumetric flask is filled with distilled water to 80% of its volume, and a magnetic stir bar is placed in the flask. Separately, using a weighing paper or beaker the following amounts of dry ingredients are weighed to within ±0.01 g using an analytical balance and are added quantitatively to the volumetric flask in the same order as listed below. The solution is stirred on a suitable stir plate until all the solids are dissolved, the stir bar is removed, and the solution diluted to 1 L volume with distilled water. A stir bar is again inserted, and the solution stirred on a stirring plate for a few minutes more.

Quantities of salts to make 1 liter of Jayco Synthetic Urine:
Potassium Chloride (KCl) 2.00 g
Sodium Sulfate ($Na_2SO4$) 2.00 g
Ammonium dihydrogen phosphate (NH4H2PO4) 0.85 g
Ammonium phosphate, dibasic ((NH4)2HPO4) 0.15 g
Calcium Chloride (CaCl2) 0.19 g—[or hydrated calcium chloride (CaCl2.2H2O) 0.25 g]
Magnesium chloride (MgCl2) 0.23 g—[or hydrated magnesium chloride (MgCl2.6H2O) 0.50 g]

To make the preparation faster, each salt is completely dissolved before adding the next one. Jayco synthetic urine may be stored in a clean glass container for 2 weeks. The solution should not be used if it becomes cloudy. Shelf life in a clean plastic container is 10 days. 0.118 M Sodium Chloride (NaCl) Solution: 0.118 M Sodium Chloride is used as salt solution 1032. Using a weighing paper or beaker 6.90 g (±0.01 g) of sodium chloride is weighed and quantitatively transferred into a 1 L volumetric flask; and the flask is filled to volume with distilled water. A stir bar is added and the solution is mixed on a stirring plate until all the solids are dissolved.

Test Preparation

Using a solid reference cylinder weight (not shown) (40 mm diameter; 140 mm height), a caliper gauge (not shown) (e.g., Mitotoyo Digimatic Height Gage) is set to read zero. This operation is conveniently performed on a smooth and level bench top 1046. The piston/cylinder assembly 1028 without SAP particles is positioned under the caliper gauge (not shown) and a reading, L1, is recorded to the nearest 0.01 mm.

The constant hydrostatic head reservoir 1014 is filled with salt solution 1032. The bottom 1034 of the air-intake tube 1010 is positioned so as to maintain the top part (not shown) of the liquid meniscus (not shown) in the cylinder 1120 at the 5.00 cm mark 1156 during the measurement. Proper height alignment of the air-intake tube 1010 at the 5.00 cm mark 1156 on the cylinder 1120 is critical to the analysis.

The receiving vessel 1024 is placed on the balance 1026 and the digital output of the balance 1026 is connected to a computerized data acquisition system (not shown). The ring stand 1040 with a 16 mesh rigid stainless steel support screen (not shown) is positioned above the receiving vessel 1024. The 16 mesh screen (not shown) should be sufficiently rigid to support the piston/cylinder assembly 1028 during the measurement. The support screen (not shown) must be flat and level.

UPM Procedure 1.5 g (±0.05 g) of SAP particles is weighed onto a suitable weighing paper or weighing aid using an analytical balance. The moisture content of the SAP particles is measured according to the Edana Moisture Content Test Method 430.1-99 ("Superabsorbent materials—Polyacrylate superabsorbent powders—Moisture Content—weight loss upon heating" (February 99)). If the moisture content of the SAP particles is greater than 5%, then the SAP particles weight should be corrected for moisture (i.e., in that particular case the added SAP particles should be 1.5 g on a dry-weight basis).

The empty cylinder 1120 is placed on a level benchtop 1046 and the SAP particles are quantitatively transferred into the cylinder 1120. The SAP particles are evenly dispersed on the screen (not shown) attached to the bottom 1148 of the cylinder 1120 by gently shaking, rotating, and/or tapping the cylinder 1120. It is important to have an even distribution of particles on the screen (not shown) attached to the bottom 1148 of the cylinder 1120 to obtain the highest precision result. After the SAP particles have been evenly distributed on the screen (not shown) attached to the bottom 1148 of the cylinder 1120 particles must not adhere to the inner cylinder walls 1150. The piston shaft 1114 is inserted through the first lid opening 1134, with the lip 1154 of the lid 1116 facing towards the piston head 1118. The piston head 1118 is carefully inserted into the cylinder 1120 to a depth of a few centimeters. The lid 1116 is then placed onto the upper rim 1144 of the cylinder 1120 while taking care to keep the piston head 1118 away from the SAP particles. The lid 1116 and piston shaft 1126 are then carefully rotated so as to align the third, fourth, fifth, and sixth linear index marks are then aligned. The piston head 1118 (via the piston shaft 1114) is then gently lowered to rest on the dry SAP particles. The weight 1112 is positioned on the upper portion 1128 of the piston shaft 1114 so that it rests on the shoulder 1124 such that the first and second linear index marks are aligned. Proper seating of the lid 1116 prevents binding and assures an even distribution of the weight on the hydrogel layer 1318.

Swelling Phase: An 8 cm diameter fritted disc (7 mm thick; e.g. Chemglass Inc. #CG 201-51, coarse porosity) 1310 is saturated by adding excess JSU 1312 to the fritted disc 1310 until the fritted disc 1310 is saturated. The saturated fritted disc 1310 is placed in a wide flat-bottomed Petri dish 1314 and JSU 1312 is added until it reaches the top surface 1316 of the fritted disc 1310. The JSU height must not exceed the height of the fitted disc 1310.

The screen (not shown) attached to the bottom 1148 of the cylinder 1120 is easily stretched. To prevent stretching, a sideways pressure is applied on the piston shaft 1114, just above the lid 1116, with the index finger while grasping the cylinder 1120 of the piston/cylinder assembly 1028. This "locks" the piston shaft 1114 in place against the lid 1116 so that the piston/cylinder assembly 1028 can be lifted without undue force being exerted on the screen (not shown).

The entire piston/cylinder assembly 1028 is lifted in this fashion and placed on the fritted disc 1310 in the Petri dish 1314. JSU 1312 from the Petri dish 1314 passes through the fritted disc 1310 and is absorbed by the SAP particles (not shown) to form a hydrogel layer 1318. The JSU 1312 available in the Petri dish 1314 should be enough for all the swelling phase. If needed, more JSU 1312 may be added to the Petri dish 1314 during the hydration period to keep the JSU 1312 level at the top surface 1316 of the fritted disc 1310. After a period of 60 minutes, the piston/cylinder assembly 1028 is removed from the fritted disc 1310, taking care to lock the piston shaft 1114 against the lid 1116 as described above and ensure the hydrogel layer 1318 does not lose JSU 1312 or take in air during this procedure. The piston/cylinder assembly 1028 is placed under the caliper gauge (not shown) and a reading, L2, is recorded to the nearest 0.01 mm. If the reading changes with time, only the initial value is recorded. The thickness of the hydrogel layer 1318, L0 is determined from L2−L1 to the nearest 0.1 mm.

The piston/cylinder assembly 1028 is transferred to the support screen (not shown) attached to the ring support stand 1040 taking care to lock the piston shaft 1114 in place against the lid 1116. The constant hydrostatic head reservoir 1014 is positioned such that the delivery tube 1018 is placed through the second lid opening 1136. The measurement is initiated in the following sequence:

a) The stopcock 1020 of the constant hydrostatic head reservoir 1014 is opened to permit the salt solution 1032 to reach the 5.00 cm mark 1156 on the cylinder 1120. This salt solution 1032 level should be obtained within 10 seconds of opening the stopcock 1020.

b) Once 5.00 cm of salt solution 1032 is attained, the data collection program is initiated.

With the aid of a computer (not shown) attached to the balance 1026, the quantity of salt solution 1032 passing through the hydrogel layer 1318 is recorded at intervals of 20 seconds for a time period of 10 minutes. At the end of 10 minutes, the stopcock 1020 on the constant hydrostatic head reservoir 1014 is closed.

The data from 60 seconds to the end of the experiment are used in the UPM calculation. The data collected prior to 60 seconds are not included in the calculation. The flow rate Fs (in g/s) is the slope of a linear least-squares fit to a graph of the weight of salt solution 1032 collected (in grams) as a function of time (in seconds) from 60 seconds to 600 seconds.

The Urine Permeability Measurement (Q) of the hydrogel layer 1318 is calculated using the following equation:

$$Q = [F_g \times L0] / [\rho \times A \times \Delta P],$$

where Fg is the flow rate in g/sec determined from regression analysis of the flow rate results, L0 is the initial thickness of the hydrogel layer 1318 in cm, ρ is the density of the salt solution 1032 in gm/cm3. A (from the equation above) is the area of the hydrogel layer 1318 in cm2, ΔP is the hydrostatic pressure in dyne/cm2, and the Urine Permeability Measurement, Q, is in units of cm3 sec/gm. The average of three determinations should be reported.

FSR Test method

This method determines the speed of SAP particles, especially polymeric hydrogelling particles, such as cross-linked poly-acrylates to swell in 0.9% Saline (aqueous 0.9 mass % NaCl solution). The measurement principle is to allow SAP particles to absorb a known amount of fluid, and the time taken to absorb the fluid is measured. The result is then expressed in grams of absorbed fluid per gram of material per second. All testing is conducted at 23±2° C.

Four grams of a representative sample of the SAP particles is dried in an uncovered 5 cm diameter Petri dish in a vacuum chamber at 23±2° C. and 0.01 torr or lower for 48 hours prior to measurement.

About 1 g (+/−0.1 g) of the test specimen is removed from the vacuum chamber and immediately weighed to an accuracy of 0.001 g into a 25 ml beaker, which has 32 to 34 mm inside diameter, and 50 mm height. The material is evenly spread over the bottom. 20 g of 0.9% Saline are weighed to an accuracy of +/−0.01 g in a 50 ml beaker, and are then poured carefully but quickly into the beaker containing the test material. A timer is started immediately upon the liquid contacting the material. The beaker is not moved or agitated during swelling.

The timer is stopped, and the time recorded to the nearest second (or more accurately if appropriate), when the last part of undisturbed fluid is reached by the swelling particles. In order to increase the reproducibility of the determination of the end point, the liquid surface can be illuminated by a small lamp without heating the surface by that lamp. The beaker is re-weighed to determine the actually picked up liquid to within ±0.1 g.

The free-swell rate is calculated by dividing the weight of SAP particles by the amount of actually picked up liquid, and dividing the result by the time required for this pick up, and is expressed in "g/g/s". Three measurements are performed and the results averaged to obtain the FSR value in g/g/s, reported to 3 significant figures.

EXAMPLES

For Examples 1 and 2 the supercritical fluid extraction unit as described in Zetzl et al. (2003), "Standardised Low Cost SFE—Units for University Education and Comparative Research", Proceedings of the 6th International Symposium on Supercritical Fluides, Versailles, (2), 577-581, ISBN 2-905-267-37-02 has been used. For Examples 3 and 4 the equipment used was generally similar, but the extractor had a volume of 1000 ml. Also, the equipment differed from the one of Examples 1 and 2 in that it was a "closed loop" system to allow the solvent (e.g. $CO_2$) to be recycled. The 1000 unit allows for a significantly higher mass flow: While the 100 ml unit of Examples 1 and 2 enables up to 2 kg/hour solvent flow, the 1000 ml unit allows up to 10 kg/hour of solvent flow. Also, the 1000 ml unit allows pressure up to 1000 bar and temperatures up to 100° C.

Example 1

The SAP particles of Example 1 are the superabsorbent polymer particles which are used in Pampers "Cruisers" diapers commercially available in the USA in February 2011. These SAP particles are generally made according to US 2009/0275470A1. Two samples (Sample 1 and 2) were tested under the same conditions.
  Amount of SAP particles: 8 g
  Solvent: CO2
  Autoclave pressure: 450 bar
  Autoclave temperature: 45° C.
  Flow rate: 0.7 kg/h
  Extraction time: 120 min
  CRC, FSR and UPM were measured before and after the samples were subjected to the supercritical fluid treatment.
Results

|  | CRC (g/g) | FSR (g/g/s) | UPM ($1 \times 10^{-7}$ $(cm^3 \cdot s)/g$) |
|---|---|---|---|
| Sample 1 before SCF treatment | 26.8 | 0.25 | 102 |
| Sample 1 after SCF treatment | 26.9 | 0.23 | 101 |
| Sample 2 before SCF treatment | 26.3 | 0.15 | 94 |
| Sample 2 after SCF treatment | 26.2 | 0.14 | 103 |

The data show that the capacity (CRC), free swell rate (FSR) and the permeability (UPM) of SAP particles do not decrease during the SCF treatment, at least as long as pure SAP particles samples are tested, i.e. as long as the SAP particles are not contaminated and are not comprised in an absorbent article.

Examples 2 to 4 focus on the behavior of contaminated SAP particles within an absorbent article when subjected to SCF treatment.

Example 2

Pampers "Cruisers" diapers, Size 5, as marketed in the USA in February 2011 (Samples 3 to 6) have been subjected different extraction conditions. The absorbent cores of these diapers comprise 12.8 g of SAP particles and 0.84 g of solidified thermoplastic composition. The SAP particles are immobilized by the solidified thermoplastic composition. It should be noted however, that the complete diaper comprises 1.83 g of solidified thermoplastic composition, as various components within the article are adhered to each other using such a solidified thermoplastic composition (e.g. when gluing the topsheet to the backsheet at the periphery or when attaching leg elastics to nonwoven layers surrounding them). During extraction, all thermoplastic compositions within the article are affected by the supercritical fluid. As all the solidified thermoplastic compositions are extracted, the absorbent article will fall apart into separate pieces relatively easily after the SCF treatment.
  Sample 3 (1 Diaper)
  Solvent: $CO_2$
  Autoclave pressure: 450 bar
  Autoclave temperature: 45° C.
  Flow rate: 0.5 kg/h
  Extraction time: 90 min
  Sample 4 (1 Diaper)
  Solvent: $CO_2$
  Autoclave pressure: 500 bar
  Autoclave temperature: 45° C.
  Flow rate: 0.8 kg/h
  Extraction time: 115 min
  Sample 5 (1 Diaper)
  Solvent: $CO_2$ and Ethanol
  Autoclave pressure: 350 bar
  Autoclave temperature: 45° C.
  Flow rate: 0.5 kg/h $CO_2$ and 6 ml/h Ethanol
  Extraction time: 120 min
  Sample 6 (1 Diaper)
  Solvent: $CO_2$
  Autoclave pressure: 350 bar
  Autoclave temperature: 45° C.
  Flow rate: 0.7 kg/h $CO_2$
  Extraction time: 120 min
  After extraction treatment in the SCF unit, the SAP particles were separated from the solidified thermoplastic compositions, with which they were contaminated in the diaper prior to extraction. The recycled particles were then tested for their CRC and UPM values. The respective values of the raw material SAP particles, which were used to manufacture the diapers of Samples 3 to 6 were also measured. For the CRC measurements, the moisture content of the SAP particles recycled from Samples 3 to 6 was the same as the moisture content of the raw material SAP particles.

Results

|  | CRC (g/g) | UPM $(1 \times 10^{-7}$ $(cm^3 \cdot s)/g)$ |
|---|---|---|
| Sample 3 | 26.9 | 63 |
| Sample 4 | 26.2 | 63 |
| Sample 5 | 26.7 | 60 |
| Sample 6 | 26.5 | 62 |
| Raw material SAP particles | 26.8 | 93 |

The data show that the capacity (CRC) of the SAP particles does not decrease due to the SCF treatment, however, the permeability values (UPM) decrease. The UPM value does not decrease to an extent that the recycled SAP particles cannot be used in absorbent articles, especially if they are mixed with non-recycled SAP particles. The overall quality of the SAP particles was good for all four different extraction conditions.

Example 3

Pampers "Cruisers" diapers, Size 5, as marketed in the USA in February 2011 (Sample 7) have been subjected to SCF treatment in a unit having a 1000 ml extractor:
Sample 7 (5 Diapers in the 1000 ml Extractor)
  Solvent: $CO_2$
  Autoclave pressure: 375 bar
  Autoclave temperature: 45° C.
  Flow rate: 2.2 kg/h
  Extraction time: 180 min
  Recycling of Carbon dioxide at 55 bar, 17° C.

After extraction treatment in the SCF unit, the SAP particles were separated from the solidified thermoplastic compositions, with which they were contaminated in the diaper prior to extraction. The recycled particles were then tested for their CRC, FSR and UPM values. The respective values of the raw material SAP particles, which were used to manufacture the diapers of Sample 7 were also measured. For the CRC measurement, the moisture content of the SAP particles recycled from Sample 7 was the same as the moisture content of the raw material SAP particles.

Results

|  | CRC (g/g) | FSR (g/g/s) | UPM $(1 \times 10^{-7}$ $(cm^3 \cdot s)/g)$ |
|---|---|---|---|
| Sample 7 | 27.4 | 0.27 | 59 |
| Raw material SAP particles | 26.8 | 0.27 | 90 |

The data show that the capacity (CRC) and the FSR of the SAP particles does not decrease due to the SCF treatment, however, the permeability values (UPM) decrease. As for the samples of Example 2, the UPM value of sample 7 does not decrease to an extent that the recycled SAP particles cannot be used in absorbent articles, especially if they are mixed with non-recycled SAP particles. The overall quality of the SAP particles was good.

Example 4

Pampers "Cruisers" diapers, Size 5, as marketed in the USA in February 2011 (Sample 7) have been subjected to SCF treatment in a unit having a 1000 ml extractor and using different extraction conditions:

Sample 8 (5 Diapers in the 1000 ml Extractor)
  Solvent: $CO_2$
  Autoclave pressure: 300 bar
  Autoclave temperature: 45° C.
  Flow rate: 2.2 kg/h
  Extraction time: 180 min
  Recycling of Carbon dioxide at 55 bar, 17° C.
Sample 9 (5 Diapers in the 1000 ml Extractor)
  Solvent: $CO_2$
  Autoclave pressure: 300 bar
  Autoclave temperature: 45° C.
  Flow rate: 7.8 kg/h
  Extraction time: 60 min
  Recycling of Carbon dioxide at 55 bar, 17° C.
Sample 10 (5 Diapers in the 1000 ml Extractor)
  Solvent: $CO_2$
  Autoclave pressure: 350 bar
  Autoclave temperature: 45° C.
  Flow rate: 7.5 kg/h
  Extraction time: 60 min
  Recycling of Carbon dioxide at 55 bar, 17° C.

After extraction treatment in the SCF unit, the SAP particles were separated from the solidified thermoplastic compositions, with which they were contaminated in the diaper prior to extraction. The recycled particles were then tested for their CRC, FSR and UPM values. The respective values of the raw material SAP particles, which were used to manufacture the diapers of Samples 8, 9 and 10 were also measured. For the CRC, measurement, the moisture content of the SAP particles recycled from Samples 8, 9 and 10 was the same as the moisture content of the raw material SAP particles.

Results

|  | CRC (g/g) | FSR (g/g/s) | UPM $(1 \times 10^{-7}$ $(cm^3 \cdot s)/g)$ |
|---|---|---|---|
| Sample 8 | 27.3 | 0.23 | 64 |
| Sample 9 | 27.2 | 0.21 | 59 |
| Sample 10 | 27.1 | 0.26 | 63 |
| Raw material SAP particles | 26.8 | 0.30 | 93 |

The data show that the capacity (CRC) and the FSR of the SAP particles does not decrease due to the SCF treatment, however, the permeability values (UPM) decrease. As for the samples of Examples 2 and 3, the UPM value of samples 8, 9 and 10 does not decrease to an extent that the recycled SAP particles cannot be used in absorbent articles, especially if they are mixed with non-recycled SAP particles. The overall quality of the SAP particles was good.

All patents and patent applications (including any patents which issue thereon) assigned to the Procter & Gamble Company referred to herein are hereby incorporated by reference to the extent that it is consistent herewith.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent core comprising superabsorbent polymer particles, wherein a part of the superabsorbent polymer particles are recycled superabsorbent polymer particles, the recycling comprising separating contaminated superabsorbent polymer particles from a solidified thermoplastic composition;
wherein separating contaminated superabsorbent polymer particles from a solidified thermoplastic composition comprises the steps of:
a) providing agglomerates of contaminated superabsorbent polymer particles and the solidified thermoplastic composition, wherein at least a part of the contaminated superabsorbent polymer particles are adhered to at least a part of the solidified thermoplastic composition;
b) subjecting the agglomerates to a supercritical fluid comprising carbon dioxide, propane, or mixtures thereof.

2. An absorbent core according to claim 1, wherein the contaminated superabsorbent polymer particles have a ratio of superabsorbent polymer particles to solidified thermoplastic composition of from about 10 to about 1.

3. An absorbent core according to claim 2, wherein the ratio is from about 10 to about 0.5.

4. An absorbent core according to claim 1, wherein the recycled superabsorbent polymer particles are more than about 1 weight percent of the total amount of superabsorbent polymer particles comprised by the absorbent core.

5. An absorbent core according to claim 4, wherein the recycled superabsorbent polymer particles are more than about 5 weight percent of the total amount of superabsorbent polymer particles comprised by the absorbent core.

6. An absorbent core according to claim 1, wherein the recycled superabsorbent polymer particles are less than about 70 weight percent of the total amount of superabsorbent polymer particles comprised by the absorbent core.

7. An absorbent core according to claim 6, wherein the recycled superabsorbent polymer particles are less than about 50 weight percent of the total amount of superabsorbent polymer particles comprised by the absorbent core.

8. An absorbent core according to claim 7, wherein the recycled superabsorbent polymer particles are less than about 20 weight percent of the total amount of superabsorbent polymer particles comprised by the absorbent core.

9. An absorbent core according to claim 8, wherein the recycled superabsorbent polymer particles are less than about 15 weight percent of the total amount of superabsorbent polymer particles comprised by the absorbent core.

10. An absorbent core according to claim 1, wherein the absorbent core comprises a blend of the recycled superabsorbent polymer particles and non-recycled superabsorbent polymer particles, and wherein the recycled superabsorbent polymer particles and the non-recycled superabsorbent polymer particles have been mixed with each other prior to incorporating them in the absorbent core.

11. An absorbent core according to claim 1, wherein the Urine Permeability Measurement (UPM) value of the recycled superabsorbent polymer particles does not decrease by more than about 40% during the process of recycling.

12. An absorbent core according to claim 11, wherein the UPM value of the recycled superabsorbent polymer particles does not decrease by more than about 35% during the process of recycling.

13. An absorbent core according to claim 12, wherein the UPM value of the recycled superabsorbent polymer particles does not decrease by more than about 30% during the process of recycling.

14. An absorbent core according to claim 1, wherein the recycled superabsorbent particles have an UPM value of from about 60% to about 95% compared to the UPM value of the non-recycled superabsorbent polymer particles.

15. An absorbent core according to claim 1, wherein the recycled superabsorbent polymer particles have an UPM value of at least about 50 $(10^{-7} (cm^3 \cdot s)/g)$, and wherein the non-recycled superabsorbent polymer particles have an UPM value of at least about 80 $(10^{-7} (cm^3 \cdot s)/g)$.

16. An absorbent core according to claim 15, wherein the recycled superabsorbent polymer particles have an UPM value of at least about 60 $(10^{-7} (cm^3 \cdot s)/g)$.

17. An absorbent core according to claim 15, wherein the non-recycled superabsorbent polymer particles have an UPM value of at least about 100 $(10^{-7} (cm^3 \cdot s)/g)$.

18. An absorbent core according to claim 1, wherein the solidified thermoplastic composition comprises at least 30 weight percent of a thermoplastic polymer based on the weight of the solidified thermoplastic composition.

19. An absorbent core according to claim 1, wherein the absorbent core is comprised within an absorbent article, the absorbent article being selected from the group consisting of diapers, training pants, and sanitary napkins.

20. An absorbent core according to claim 19, wherein the absorbent article is a diaper.

21. An absorbent core according to claim 1, wherein the supercritical fluid comprises carbon dioxide.

22. An absorbent core according to claim 1, wherein the supercritical fluid comprises propane.

* * * * *